INVENTOR.
Harry S. Clark.
BY Schmieding and Fultz
ATTORNEYS

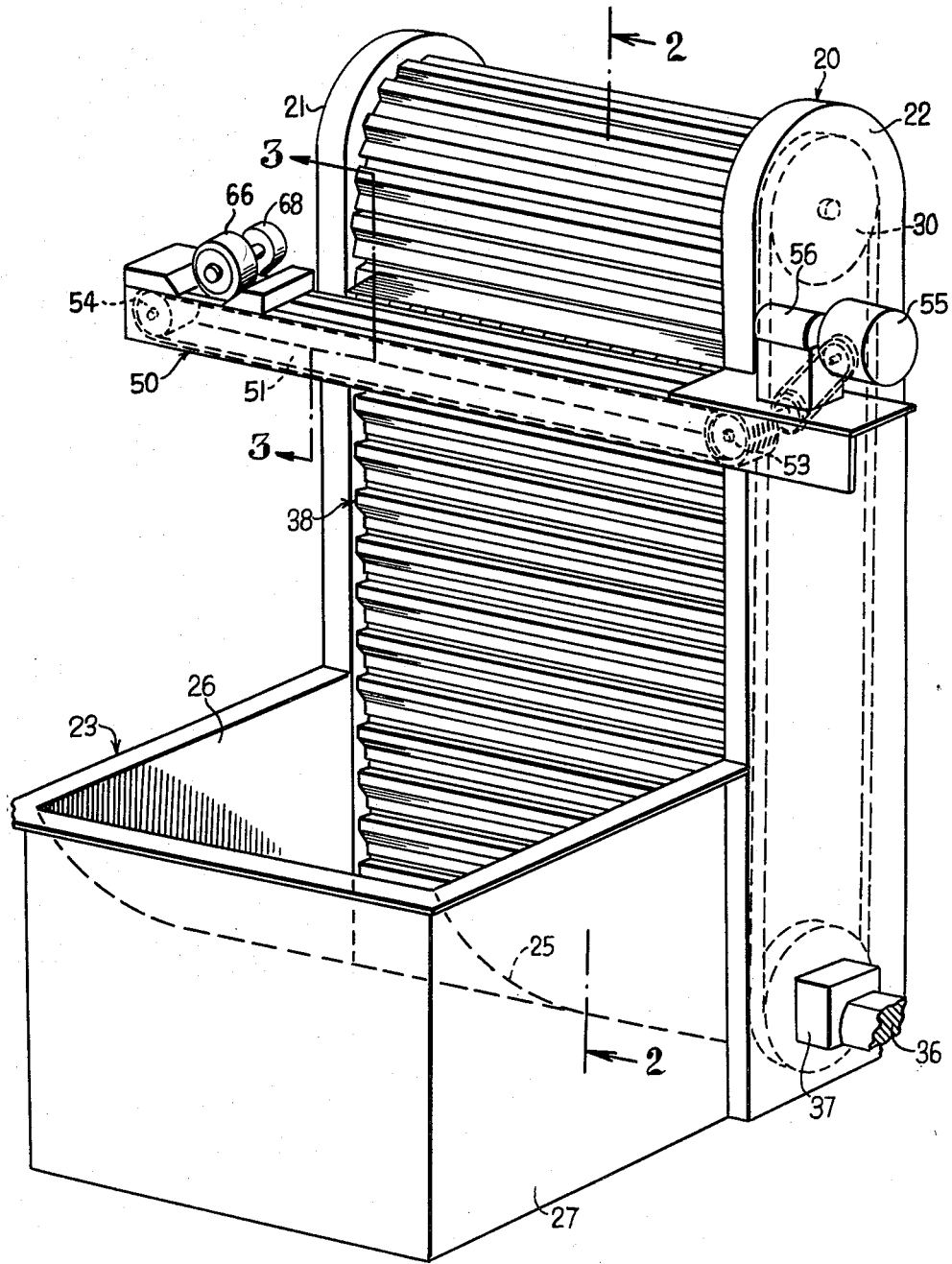

United States Patent Office 2,954,862
Patented Oct. 4, 1960

2,954,862

ARTICLE LOADING MACHINE

Harry S. Clark, Mounted Rte. 9, Delaware, Ohio

Filed June 26, 1957, Ser. No. 668,077

10 Claims. (Cl. 198—30)

This invention relates to machines for aligning randomly disposed articles and for successively transporting such articles to a destination such as a metal working machine.

In general, the machine of the present invention includes a hopper for receiving randomly disposed articles such as lengths of bar stock, tubing, pipe nipples, or similar work pieces upon which machine operations are to be performed. The machine further includes a vertically disposed endless conveyor which is moved upwardly through the hopper. Such upwardly moving conveyor is provided with a plurality of flights so constructed that only those work pieces in the hopper that are axially aligned with the flights will be picked up by the flight and carried upwardly. The machine further includes a novel automatic ejecting mechanism for successively discharging the work pieces from the flights and for automatically positioning same in axially aligned relationship on a horizontally disposed conveying means which in turn conveys the work pieces to a metal working machine or other destination to which the work pieces are to be delivered in aligned relationship.

It is therefore an object of the present invention to provide a machine of the type described that includes novel article ejecting mechanism for transferring articles from an upwardly moving conveyor to a horizontally moving conveyor.

It is another object of the present invention to provide a machine of the type described that includes novel article ejecting mechanism that permits the passage of oversize articles through such mechanism without jamming or causing damage to the machine.

It is another object of the present invention to provide a machine of the type described that includes an upwardly moving conveyor for picking up articles in aligned relationship, a horizontally disposed conveyor for transporting said articles to a destination, and a novel article ejecting mechanism adapted to transfer said articles between said conveyors at high rates of production.

It is still another object of the present invention to provide a machine of the type described that incorporates a simplified conveying mechanism for receiving articles in aligned relationship and for ejecting the articles, in said aligned relationship, to a conveying means.

Further objects and advantages of the present invention will be apparent from the following description, reference being had to the accompanying drawings wherein a preferred form of embodiment of the invention is clearly shown.

In the drawings:

Figure 1 is a perspective view of an article aligning and transporting machine constructed according to the present invention;

Figure 3:
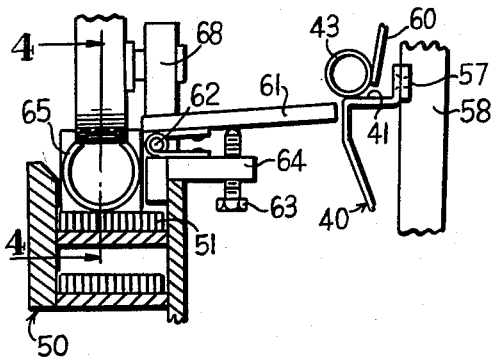
Figure 3 is a partial view partially in section of the machine of the preceding figures, the section being taken along the line 3—3 of Figure 1.

Referring in detail to the drawing, Figure 1 illustrates a machine constructed according to the present invention and including a frame indicated generally at 20 which frame includes left and right side plates 21 and 22. A hopper mounted generally at 23 is mounted to the side plates 21 and 22 and includes an upwardly inclined bottom wall 25 supported between side walls 26 and 27.

Figure 2:
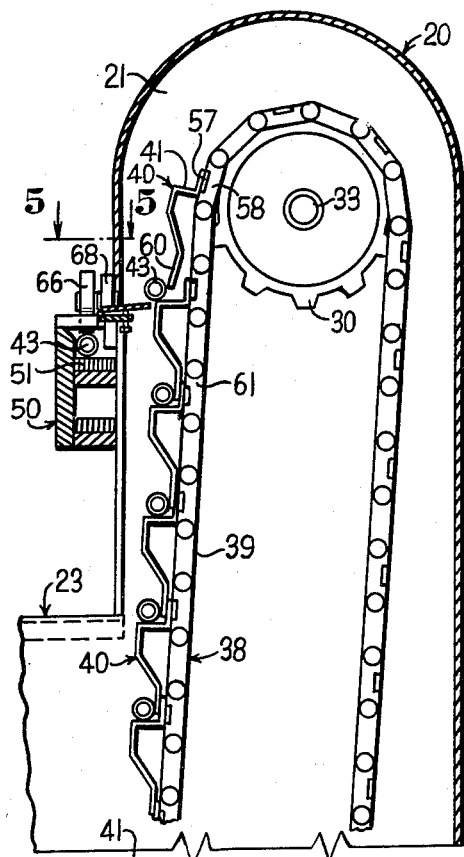
Figure 2 is a side sectional view of the machine of Figure 1, the section being taken along the line 2—2 of Figure 1.

As is best seen in Figure 2 an upper sprocket 30 and a lower sprocket 31 are rotatably mounted between side plates 21 and 22 by means of an upper shaft 33 and a lower shaft 34. As is illustrated in Figure 1, a motor 36 and a variable speed drive 37 are mounted to the frame 20 and serve to drive lower sprocket 31.

An upwardly disposed endless conveyor, indicated generally at 38, includes a link chain 39, carried on sprockets 30 and 31 and a plurality of flights indicated generally at 40.

Each of the flights 40 includes an article receiving surface 41 adapted to receive from hopper 23 only those of the work pieces 43 that are axially aligned with the transfer axes of the flights 41. In Figure 1, the articles 43, resting on the bottom wall 25 of the hopper, are shown axially aligned with a flight 40 and in such position the articles that roll onto flight 40 will be retained on article receiving surface 41 and carried upwardly. With reference to Figures 1 and 2 a horizontally disposed conveying means, indicated generally at 50, is mounted to the upper portion of frame 20, such conveying means may be formed by a horizontally disposed conveyor 51 which may be formed by a chain mounted on sprockets 53 and 54. As seen in Figure 1, motor 55 and a variable speed drive 56 are arranged to rotate sprocket 53 and thereby impart horizontal movement to horizontal conveyor 51.

With reference to Figures 2 and 3 each of the flights 40 has its upper end 57 rigidly connected to a link 58 of chain 59 such that as link 58 starts to curve around upper sprocket 30 a lower end portion 60 of flight 40 is caused to move outwardly since the rigidly connected upper end 57 of flight 40 moves from a first vertically extending straight path portion to a second path portion, defined by the periphery of sprocket 30, that departs in direction from said first path portion. Such outward movement of the lower end 60 of flight 40 serves to roll articles 43 off of surface 41 and onto inclined ramp 61. The articles 43 then roll across inclined ramp 61 and drop downwardly onto the upper surface of horizontal conveyor 51.

As seen in Figure 3 inclined ramp 61 is pivotally mounted at hinge pin 62 such that the inclined ramp will swing upwardly in the event that an oversized article is carried upwardly against its upper surface, hence any possibility of jamming or damage to the machine is avoided.

As is best seen in Figure 3 the angle of inclination of inclined ramp 61 can be readily adjusted by means of a screw 63 carried in a threaded hole in frame member 64.

Figure 4:
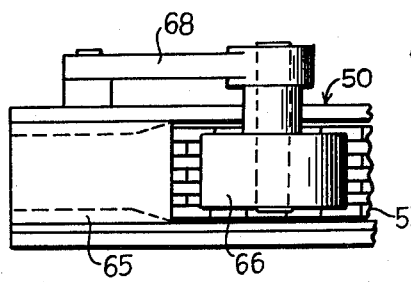
Figure 4 is a partial view partially in section of a portion of the machine of the preceding figures, the section being taken along the line 4—4 of Figure 3.
Figure 5:
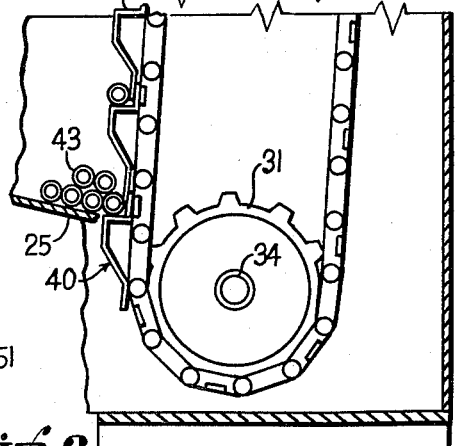
Figure 5 is a partial plan view showing a portion of the machine of the preceding figures, the view being taken along the line 5—5 of Figure 2.

With reference to Figures 4 and 5, after the articles 43 are delivered to the upper surface of the horizontal conveyor 51, such conveyor delivers the articles to an article guiding means or tube 65 that leads to the metal working machine or other destination to which the articles are to be conveyed. The articles 43 that have entered tube 65 are pushed along by the force exerted on such articles by the article entering tube 65, as seen in Figure 4, where it will be noted that a roller 66 carried by pivotally mounted arm 68 engages the top of the article 43 entering tube 65. The weight of roller 66 and arm 68 urge the articles entering tube 65 against horizontal conveyor 51 whereby the article 43 engaged by roller 66 is pushed into the tube and the articles therein are pushed along the tube by the energy of horizontal conveyor 51. The outer surface of roller 66 may be covered with a resilient material indicated at 67 in Figure 4.

In operation, articles are poured into hopper 43 in random disposition. The upwardly moving conveyor 38 picks up, on surface 41 of the flights, those of the articles 43 which are axially aligned with a lateral axes of the flights. The aligned articles are automatically ejected onto the inclined ramp 61 by outward movement of the lower portion 60 of the flight next above, and such articles roll down the incline of ramp 61 and onto the upper surface of horizontal conveyor 51. At this point it should be pointed out that in the event that any of the articles 43 roll beyond the conveyor 51 they will fall back into hopper 43 and will eventually again be picked up by the flights 40. The aligned articles delivered to horizontal conveyor 51 are sequentially advanced to roller 66 and pushed along tube 65 to the metal working machine or other destination to which the articles are to be delivered.

While the form of embodiment of the present invention as herein disclosed constitutes a preferred form, it is to be understood that other forms might be adopted, all coming within the scope of the claims which follow:

I claim:

1. An article loading machine comprising, in combination, conveying means including an upwardly moving endless conveyor provided with a plurality of transverse flights forming upwardly facing article receiving surfaces and downwardly extending article moving portions, each of said portions being disposed above a respective one of said article receiving surfaces on a next lower flight; article moving means including a horizontally extending surface located adjacent said upwardly moving endless conveyor; and means for successively moving said article moving portions of said flights, relative to a respective article receiving surface, responsive to movement of said flights to a position above said horizontally extending surface.

2. An article loading machine comprising, in combination, a hopper for receiving a supply of said articles in random disposition; conveying means including an upwardly moving endless conveyor communicating with said hopper, said conveyor including a plurality of transverse flights forming article receiving surfaces; article moving means including a horizontally extending surface located adjacent said upwardly moving endless conveyor; means for moving said articles from said flights to said horizontally extending surface, said means including elements mounted on said endless conveyor and disposed behind said articles on said flights, said elements being moveable outwardly responsive to upward movement of said flights to a certain location above said horizontally extending surface.

3. Apparatus as defined in claim 2 wherein said elements are formed by downwardly projecting portions of said flights.

4. An article loading machine comprising, in combination, a hopper for receiving a supply of said articles in random disposition; conveying means including an upwardly moving endless conveyor communicating with said hopper, said conveyor including a plurality of transverse flights forming article receiving surfaces; article moving means including a horizontally extending surface located adjacent said upwardly moving endless conveyor; means for moving said articles from said flights to said horizontally extending surface; and a ramp having an inner edge adjacent the path of said flights and an outer edge adjacent said horizontally extending surface, said ramp being yieldingly mounted for upward movement responsive to engagement by an oversize article.

5. An article loading machine comprising, in combination, conveying means including an upwardly moving endless conveyor that travels along a first path portion and a second path portion that departs in direction from said first path portion; a plurality of transverse flights, each of which includes an upper portion connected to said endless conveyor, an article receiving surface, and a lower portion for movement across an article receiving surface on a next adjacent flight responsive to movement of the flight from said first path portion to said second path portion; and article moving means including a second endless conveyor forming a moving horizontally extending surface located adjacent the junction of said path portions of said upwardly moving endless conveyor.

6. An article loading machine comprising, in combination, a hopper for receiving a supply of said articles in random disposition; conveying means including an upwardly moving endless conveyor communicating with said hopper, said conveyor including a plurality of transverse flights forming article receiving surfaces; article moving means including a second endless conveyor forming a moving horizontally extending surface located adjacent said upwardly moving endless conveyor; means for moving said articles from said flights to said endless conveyor; a guide for successively receiving articles from said second endless conveyor; and means for moving said articles along said guide.

7. Apparatus as defined in claim 6 characterized by said last mentioned means comprising a roller located at the entrance to said guide.

8. An article loading machine comprising, in combination, a hopper for receiving a supply of said articles in random disposition; conveying means including an upwardly moving endless conveyor communicating with said hopper, said conveyor including a plurality of transverse flights forming article receiving surfaces; article moving means including a second endless conveyor forming a moving horizontally extending surface located adjacent said upwardly moving endless conveyor; means for moving said articles from said flights to said endless conveyor, said means including elements mounted on said endless conveyor and disposed behind said articles on said flights, said elements being moveable outwardly responsive to upward movement of said flights to a certain location above said horizontally extending surface; a guide for successively receiving articles from said second endless conveyor; and means for moving said articles along said guide.

9. Apparatus as defined in claim 8 wherein said elements are formed by downwardly projecting portions of said flights.

10. An article loading machine comprising, in combination, a hopper for receiving a supply of said articles in random disposition; conveying means including an upwardly moving endless conveyor communicating with said hopper, said conveyor including a plurality of transverse flights forming article receiving surfaces; article moving means including a second endless conveyor forming a moving horizontally extending surface located adjacent said upwardly moving endless conveyor; means for moving said articles from said flights to said endless conveyor; a guide for successively receiving articles from said second endless conveyor; means for moving said articles along said guide; and a ramp having an inner edge adjacent the path of said flights and an outer edge adjacent said horizontally extending surface, said ramp being yieldingly mounted for upward movement responsive to engagement by an oversize article.

References Cited in the file of this patent

UNITED STATES PATENTS

| | | |
|---|---|---|
| 660,998 | Raymond | Oct. 30, 1900 |
| 1,302,631 | Buck | May 6, 1919 |
| 2,609,912 | Engel | Sept. 9, 1952 |
| 2,734,617 | Temple | Feb. 14, 1956 |